United States Patent
Costa et al.

(10) Patent No.: US 12,441,401 B2
(45) Date of Patent: Oct. 14, 2025

(54) STEERING DEVICE WITH A STEERING SENSOR UNIT FOR INDUCTIVE DETECTION OF AT LEAST ONE ITEM OF STEERING INFORMATION

(71) Applicant: Robert Bosch GmbH, Stuttgart (DE)

(72) Inventors: Nuno Costa, São Victor (PT); Kevin Fessler-Abels, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 18/547,935

(22) PCT Filed: Mar. 17, 2022

(86) PCT No.: PCT/EP2022/056921
§ 371 (c)(1),
(2) Date: Aug. 25, 2023

(87) PCT Pub. No.: WO2022/228770
PCT Pub. Date: Nov. 3, 2022

(65) Prior Publication Data
US 2024/0132153 A1    Apr. 25, 2024
US 2024/0227935 A9    Jul. 11, 2024

(30) Foreign Application Priority Data
Apr. 28, 2021   (DE) ...................... 10 2021 204 232.5

(51) Int. Cl.
*B62D 15/02*  (2006.01)
*B62D 6/10*   (2006.01)
*G01D 5/20*   (2006.01)

(52) U.S. Cl.
CPC ............. *B62D 15/021* (2013.01); *B62D 6/10* (2013.01); *G01D 5/2046* (2013.01)

(58) Field of Classification Search
CPC ...... B62D 15/021; B62D 6/10; G01D 5/2046; G01D 11/245
See application file for complete search history.

(56) References Cited

U.S. PATENT DOCUMENTS

2006/0123903 A1*  6/2006  Gandel ................... G01L 3/104
                                                         73/328

FOREIGN PATENT DOCUMENTS

DE     37 37 696 A1   5/1989
DE     39 13 717 C1   6/1990
(Continued)

OTHER PUBLICATIONS

International Search Report corresponding to PCT Application No. PCT/EP2022/056921, mailed Jun. 20, 2022 (German and English language document) (6 pages).

*Primary Examiner* — Lindsay M Low
*Assistant Examiner* — Charles J Brauch
(74) *Attorney, Agent, or Firm* — Maginot, Moore & Beck LLP

(57) ABSTRACT

A steering device with a rotatably mounted steering shaft includes an input shaft and a separately formed output shaft, and a steering sensor unit for inductive detection of at least one item of steering information, which steering sensor unit comprises at least one sensor element and at least two rotor elements interacting with the sensor element. A first rotor element is connected for conjoint rotation to the input shaft and has a first portion associated with the sensor element and extending perpendicularly with respect to the steering shaft. A second rotor element is connected for conjoint rotation to the output shaft and has a second portion associated with the sensor element and extending perpendicularly with respect to the steering shaft. The second rotor element has a plurality of fastening lugs for fastening to the output shaft which
(Continued)

extend through leadthrough openings of the first rotor in the axial direction.

11 Claims, 6 Drawing Sheets

(56) References Cited

FOREIGN PATENT DOCUMENTS

| | | |
|---|---|---|
| DE | 199 41 464 A1 | 3/2001 |
| DE | 101 21 870 A1 | 11/2002 |
| DE | 10 2008 009 290 A1 | 8/2009 |
| DE | 10 2013 008 205 A1 | 4/2014 |
| DE | 102018202226 A1 * | 8/2019 ............... B62D 1/20 |
| JP | H1-140036 A | 6/1989 |
| KR | 10-0416965 B1 | 4/2003 |
| WO | 2020/174171 A1 | 9/2020 |

* cited by examiner

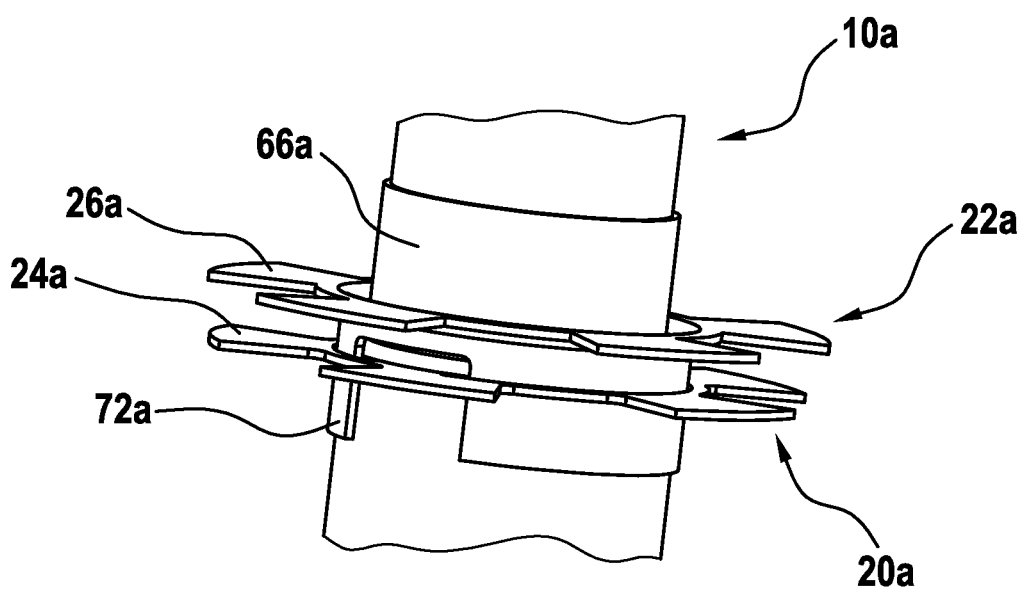

STEERING DEVICE WITH A STEERING SENSOR UNIT FOR INDUCTIVE DETECTION OF AT LEAST ONE ITEM OF STEERING INFORMATION This application is a 35 U.S.C. § 371 National Stage Application of PCT/EP2022/056921, filed on Mar. 17, 2022, which claims the benefit of priority to Serial No. DE 10 2021 204 232.5, filed on Apr. 28, 2021 in Germany, the disclosures of which are incorporated herein by reference in their entirety.

BACKGROUND

The disclosure is based on a steering device. Furthermore, the disclosure relates to a steering system having such a steering device, as well as to a method for assembling such a steering device.

Steering systems for motor vehicles with inductive steering sensors for determining a steering angle and/or a steering torque exerted on a steering shaft are known from the prior art, such as DE 199 41 464 A1 and/or DE 101 21 870 A1. Such steering sensors generally comprise a sensor housing arranged on a steering shaft, a sensor element, for example in the form of a printed circuit board with at least one sensor coil, arranged in the sensor housing, as well as at least one rotor element interacting with the sensor element and formed for conjoint rotation with the steering shaft.

Furthermore, a steering device with a closure lid for closing a steering gear housing and with a steering sensor unit arranged in a sensor receiving region of the closure lid for inductively detecting at least one item of steering information is known from DE 10 2018 202 226 A1.

The object of the disclosure is in particular to provide a steering device with improved properties in terms of stability and/or robustness. The object is achieved by the features of the disclosure, while advantageous configurations and developments of the disclosure can be found herein.

SUMMARY

The disclosure is based on a steering device with a steering shaft which is mounted rotatably, in particular about a steering axis, and comprises an input shaft, in particular a steering spindle, and an output shaft, in particular a steering pinion, which is formed separately from the input shaft and can be rotated in particular relative to the input shaft, and with a steering sensor unit for the inductive detection of at least one item of steering information, which steering sensor unit comprises at least one sensor element and at least two rotor elements which interact with the sensor element, a first rotor element of the rotor elements being connected for conjoint rotation to the input shaft and having a first rotor portion which is associated with the sensor element and extends perpendicularly with respect to the steering shaft, and a second rotor element of the rotor elements being connected for conjoint rotation to the output shaft and having a second rotor portion which is associated with the sensor element and extends perpendicularly with respect to the steering shaft.

It is proposed that the second rotor element has a plurality of, in particular at least two, fastening lugs for fastening to the output shaft and the first rotor element has a plurality of, in particular at least two, leadthrough openings for the fastening lugs, in particular for one of the fastening lugs in each case; the fastening lugs extending through the leadthrough openings in the axial direction, in particular in the mounted state and in relation to the steering shaft. This configuration can advantageously improve a stability and/or robustness of the steering device. In particular, tilting of the first rotor element and/or the second rotor element may be reduced or advantageously prevented, thereby avoiding increased friction and consequently minimizing wear and/or reducing noise interference. A service life and/or fatigue strength of the steering device can thus advantageously be improved. Moreover, a cost efficiency of the steering device may advantageously be improved.

In this context, at least a part, for example a sub-assembly, of a steering system, in particular a vehicle and preferably a motor vehicle, is to be understood as a "steering device." In particular, the steering system comprises a steering gear housing having a mounting opening for at least partially receiving the steering shaft, in particular the output shaft, and advantageously also for at least partially receiving the steering sensor unit. Moreover, the steering system may comprise further components and/or assemblies, for example at least one steering control element, which is arranged in particular in the steering gear housing and advantageously formed as a toothed rack, and/or at least one steering handle connected to the steering control element, in particular via the steering shaft.

A sensor unit that in particular encompasses the steering shaft in a circumferential direction and is provided for detecting at least one item of steering information, which in particular correlates with an actuation of the steering handle, based on a rotation of the input shaft relative to the output shaft is to be understood as a "steering sensor unit." The steering information preferably consists of a steering angle and/or a steering torque applied to the steering shaft, in particular by means of the steering handle. In the present case, the steering sensor unit is provided for inductive detection of the steering information and is accordingly different from a magnetically acting steering sensor unit for magnetically detecting steering information. In order to detect the steering information, the steering sensor unit comprises the sensor element, in particular formed as an inductive sensor element, and the rotor elements interacting with the sensor element.

In particular, the sensor element comprises at least one sensor coil, in particular in the form of an exciter and/or receiver coil, and preferably at least one carrier element, for example a board and/or a printed circuit board on which the sensor coil is arranged and which extends perpendicularly with respect to the steering shaft and/or is arranged perpendicularly with respect to the steering shaft. It is particularly advantageous for the sensor element to comprise at least two sensor coils, in particular formed as exciter coils and/or receiver coils, which are arranged on different sides and/or receiving surfaces of the carrier element. Moreover, the sensor element can comprise at least one exciter and/or evaluation circuit, which is in particular arranged on the carrier element and is in particular electrically connected to the sensor coil and/or the sensor coils. Furthermore, the sensor element is preferably arranged fixed to the housing and encompasses the steering shaft in a circumferential direction at least largely, and advantageously does so completely.

The rotor elements are formed so as to be at least partially conductive and/or magnetically permeable and are in particular provided to influence the sensor coil and/or at least one of the sensor coils. In particular, the rotor elements are provided to alter a sensor signal of the sensor coil, depending on a relative alignment of the respective rotor element to the sensor element. The first rotor element is formed for conjoint rotation with the input shaft and encompasses the steering shaft in a circumferential direction at least largely, and advantageously does so completely. In the present case, the first rotor element may be fastened to the input shaft in a force-locking and/or form-fitting manner, for example by means of a press connection and/or a caulk connection. Alternatively, however, the first rotor element may also be fastened to the input shaft in a materially bonded manner; for example, by means of an adhesive connection, a fused connection, and/or a weld connection. Furthermore, the first rotor element is preferably in the shape of a collar and/or stepped, in particular with at least one step. In this context, the first rotor element in particular comprises the first rotor portion associated with the sensor element and extending in the radial direction, which rotor portion in particular has at least one conductive and/or magnetically permeable rotor blade and preferably a plurality of rotor blades, and a first fastening portion associated with the input shaft and advantageously arranged perpendicularly with respect to the first rotor portion, which fastening portion is provided for fastening to the input shaft and preferably extends from the first rotor portion in the direction of the input shaft and/or in the direction of the steering handle. Furthermore, the second rotor element is formed for conjoint rotation with the output shaft and encompasses the steering shaft in a circumferential direction at least largely, and advantageously does so completely. In this case, the second rotor element can be fastened to the output shaft in a force-locking and/or form-fitting manner; e.g., by means of a press connection and/or a caulk connection. Alternatively, however, the second rotor element may also be fastened to the output shaft in a materially bonded manner; for example, by means of an adhesive connection, a fused connection, and/or a weld connection. Furthermore, the second rotor element is preferably in the shape of a collar and/or stepped, in particular with at least one step. In this context, the second rotor element in particular comprises the second rotor portion associated with the sensor element and extending in the radial direction, which rotor portion in particular has at least one conductive and/or magnetically permeable rotor blade and preferably a plurality of rotor blades, and a second fastening portion associated with the output shaft and advantageously arranged perpendicularly with respect to the second rotor portion, which fastening portion has the fastening lugs for fastening to the output shaft and preferably extends from the second rotor portion in the direction of the output shaft and/or in the direction of the steering control element. Particularly preferably, the first rotor element and/or the second rotor element are also formed in one piece. In this context, a "fastening lug" is in particular to be understood to mean an elongated, preferably lug-shaped and/or tongue-shaped, portion of the second rotor element, which portion extends in the axial direction in relation to the steering shaft and is provided for fastening to the output shaft. Advantageously, the fastening lugs in this case extend from the second rotor portion in the direction of the output shaft and/or in the direction of the steering control element. Furthermore, an end portion of the respective fastening lug that faces away from the second rotor portion and is in particular passed through one of the leadthrough openings, is in particular provided for fastening to the output shaft and/or fastened to the output shaft in the mounted state. The fastening lugs are furthermore preferably arranged distributed in the circumferential direction of the steering shaft and are particularly advantageously formed in a dimensionally stable manner. Preferably, the fastening lugs are furthermore formed identically to one another. Furthermore, the leadthrough openings are preferably arranged in the first rotor portion of the first rotor element and are formed correspondingly to the fastening lugs and/or adapted to the fastening lugs such that rotation of the input shaft relative to the output shaft and consequently of the first rotor element relative to the second rotor element, in particular in order to detect the steering information, is possible.

The term "at least largely" is in particular to be understood to mean at least 55%, preferably at least 75%, and particularly preferably at least 95%. "One piece" is to be understood to mean at least connected in a materially bonded manner and/or formed with one another. The material bond can be produced, for example, by an adhesive process, an injection process, a welding process, a soldering process and/or another process. Advantageously, however, "one piece" is to be understood to mean formed from one piece and/or in one piece. Preferably, this one piece is produced from a single blank, mass and/or cast, for example in an injection molding process. The term "provided" is in particular to be understood to mean specifically designed and/or equipped. The phrase "an object is provided for a particular function" is in particular to be understood to mean that the object fulfills and/or performs this particular function in at least one application and/or operating state.

For example, the first rotor portion could be arranged in the axial direction at the level of the output shaft, while the second rotor portion could be arranged in the axial direction at the level of the input shaft. Furthermore, the first rotor portion and the second rotor portion could be arranged in the axial direction at the level of the output shaft. Advantageously, however, it is proposed that the first rotor portion and the second rotor portion are arranged in the axial direction at the level of the input shaft. This can simplify assembly and/or reduce a diameter of the rotor elements, in particular due to the smaller diameter of the input shaft in comparison to the output shaft.

Moreover, it is proposed that the first rotor portion and the second rotor portion are arranged in the axial direction on opposite sides of the sensor element. In this case, the first rotor portion is particularly advantageously arranged on a side of the sensor element that faces the output shaft and/or the steering control element, and the second rotor portion is arranged on a side of the sensor element that faces away from the output shaft and/or the steering handle. This can in particular achieve a particularly high stability of the steering device and simple assembly at the same time.

If the second rotor element comprises at least three, at least four or at least five, fastening lugs that are distributed in particular in the circumferential direction of the steering shaft and are advantageously dimensionally stable, and the first rotor element comprises at least three, at least four or at least five, leadthrough openings for the fastening lugs, in particular for each one of the fastening lugs, an advantageously versatile steering device can in particular be provided, which is advantageously adaptable to different circumstances.

In a further embodiment, it is proposed that the steering sensor unit comprises a closure lid encompassing the steering shaft in the circumferential direction, which closure lid provides a sensor receiving region and is provided for closing, in an mounted state, in particular in a fluid-tight manner, a mounting opening of a steering gear housing for receiving the output shaft, and wherein the sensor element and the rotor elements are at least partially arranged in the sensor receiving region of the closure lid. The closure lid is advantageously shaped like a pot and/or cup. The cover is particularly advantageously formed in one piece, and preferably comprises a, in particular sealed and/or sealable, leadthrough opening for the steering shaft, in particular the input shaft. Moreover, the closure lid preferably comprises at least one plug connector, which is advantageously formed as a socket, and is provided for connecting a sensor cable of the steering system. In particular, the closure lid replaces an additional sensor housing in the present case. The sensor element is furthermore particularly advantageously fixedly connected to the closure lid, and in particular to an inner side of the closure lid that faces the sensor receiving region. In the present case, the term "fluid-tight" is in particular to be understood to mean fluid-tight in the context of tolerable tolerances and/or technical manufacturing possibilities. This embodiment can advantageously improve a component efficiency since an additional sensor housing can be omitted.

It is preferably furthermore proposed that the fastening lugs extend in the axial direction such that the fastening lugs are guided out of the sensor receiving region of the closure lid and are at least partially free of overlap with the closure lid when viewed in at least one direction perpendicular with respect to the steering shaft. In particular, at least the end portion of the respective fastening lug that is provided for the respective fastening to the output shaft is guided out of the sensor receiving region of the closure lid and, when viewed in at least one direction perpendicular with respect to the steering shaft, is free of overlap with the closure lid. This can further simplify assembly since the second rotor element is freely accessible for fastening to the output shaft.

Furthermore, a method for assembling the aforementioned steering device is proposed, in which the first rotor element is connected for conjoint rotation to the input shaft in a first assembling step and, in a second assembling step, in particular following the first assembling step, the fastening lugs of the second rotor element are inserted into the leadthrough openings of the first rotor element. Subsequently, in a third assembling step, in particular following the second assembling step, the fastening lugs can be fastened to the output shaft, for example by means of an adhesive connection, a weld connection, a press connection and/or a caulk connection, in order to connect the second rotor element for conjoint rotation to the output shaft. Alternatively, however, the fastening lugs may also be fastened to the output shaft directly and/or automatically in the second assembling step, for example if a frictional connection is used to fasten the fastening lugs to the output shaft. In this case, guiding the fastening lugs out of the sensor receiving region could in particular also be dispensed with. Furthermore, preferably in the second assembling step, at least using the sensor element, the second rotor element and a closure lid, in particular the aforementioned closure lid, for closing a mounting opening of a steering gear housing, a pre-assembled closure lid assembly is produced and the pre-assembled closure lid assembly is pushed onto the steering shaft in such a manner that the fastening lugs are automatically inserted into the leadthrough openings during the assembly of the closure lid assembly. This can in particular achieve the aforementioned advantages. In particular, a stability and/or robustness of the steering device can be improved thereby.

The steering device, steering system and method for assembling the steering device are not intended to be limited to the application and embodiment described above. In particular, the steering device, the steering system and the method for assembling the steering device to perform a functionality described herein may have a number of individual elements, components and units that deviates from a number mentioned herein.

BRIEF DESCRIPTION OF THE DRAWINGS

Further advantages result from the following description of the drawings. The drawings show two exemplary embodiments of the disclosure.

Shown are.

DETAILED DESCRIPTION

Figure 1:
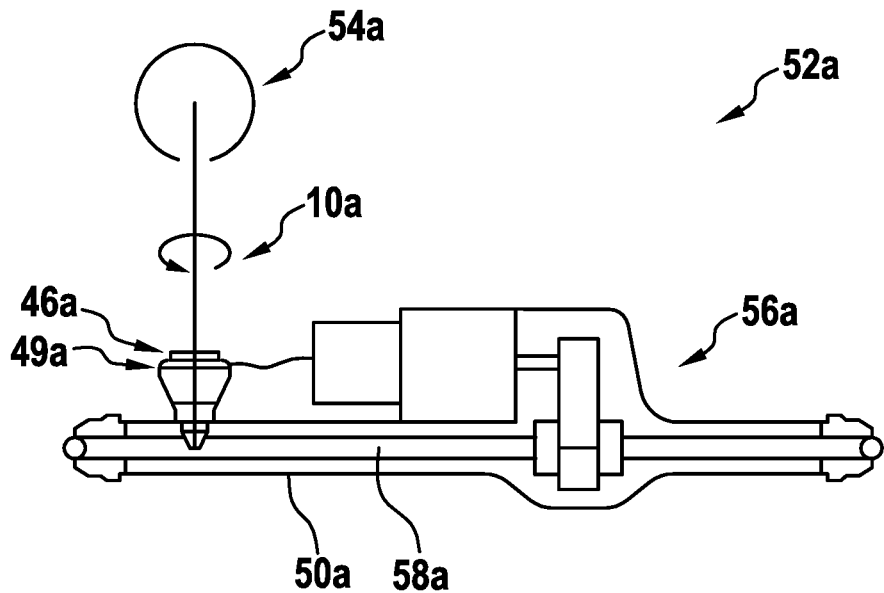
FIG. 1 an exemplary steering system having a steering device in a schematic representation, FIG. 2 a steering shaft of the steering device and a steering sensor unit of the steering device in a schematic sectional view, FIGS. 3a-c a first rotor element and a second rotor element of the steering sensor unit in various perspective representations, FIG. 4 an exemplary flowchart of a method for assembling the steering device, and FIGS. 5a-c a further exemplary embodiment of a first rotor element and a second rotor element of a further steering sensor unit in various perspective representations.

FIG. 1 shows a purely exemplary steering system 52a in a schematic representation. The steering system 52a is formed as an electrically assisted steering system and accordingly has an electric power assist. Furthermore, the steering system 52a is provided for use in a vehicle (not shown), in particular a motor vehicle, and preferably an electric vehicle. When installed, the steering system 52a is operatively connected to the vehicle wheels of the vehicle and is provided to influence a direction of travel of the vehicle. In principle, however, it is also conceivable to form a steering system as a hydraulically assisted steering system having a hydraulic power assist.

The steering system 52a comprises a steering handle 54a, formed by way of example as a steering wheel in the present case, for applying a hand torque, as well as a steering gear 56a which is known per se and is provided to convert a steering specification on the steering handle 54a into a steering movement of the vehicle wheels. For this purpose, the steering gear 56a comprises a steering gear housing 50a and a steering control element 58a arranged in the steering gear housing 50a.

Figure 2:
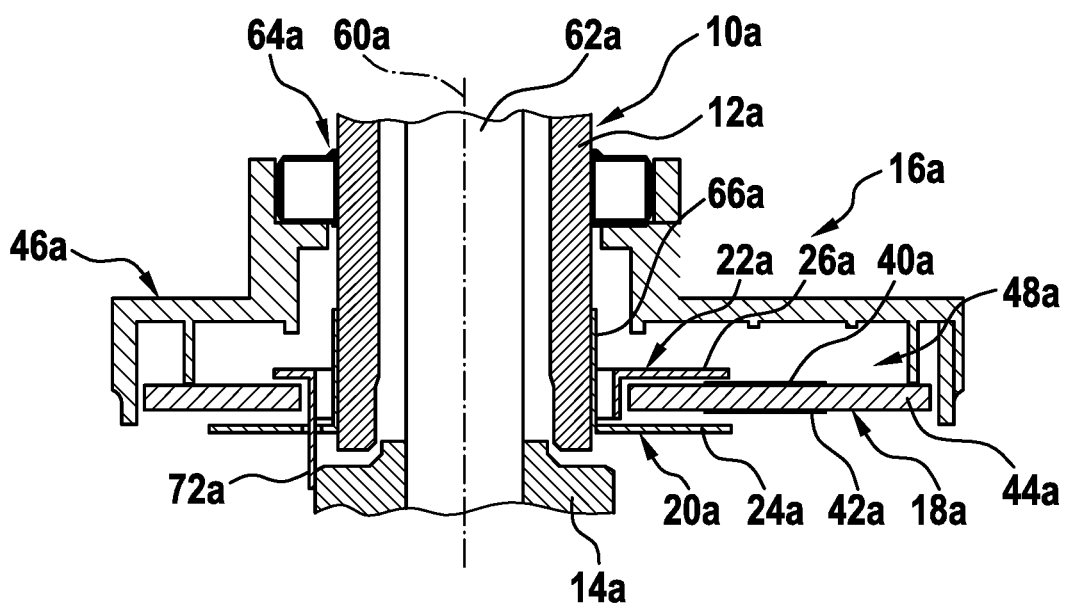

Moreover, the steering system 52a comprises a steering device (cf., in particular, also FIG. 2). The steering device comprises a steering shaft 10a, which is known per se. The steering shaft 10a connects the steering handle 54a to the steering gear 56a, in particular to the steering control element 58a, and, in the mounted state, is at least partially inserted into a mounting port 49a of the steering gear housing 50a for this purpose. A longitudinal extension of the steering shaft 10a defines an axial direction. The steering shaft 10a is furthermore rotatably mounted about a steering axis 60a that is aligned parallel to the axial direction. Furthermore, the steering shaft 10a is formed in multiple parts. The steering shaft 10a comprises an input shaft 12a, associated with the steering handle 54a, in the form of a steering spindle; an output shaft 14a, associated with the steering gear 56a and formed separately from the input shaft 12a, in the form of a steering pinion; and a torsion element 62a which is advantageously formed as a torsion bar and connects the input shaft 12a to the output shaft 14a.

Furthermore, the steering device comprises a steering sensor unit 16a. The steering sensor unit 16a is designed as an inductive steering sensor unit and is consequently based on an inductive measuring principle. The steering sensor unit 16a is arranged on the steering shaft 10a and circumferentially encompasses the steering shaft 10a. The steering sensor unit 16a is provided to detect at least one item of steering information, such as a steering angle and/or a steering torque, which is in particular correlated to an actuation of the steering handle 54a. In the present case, the steering sensor unit 16a is provided to detect the at least one item of steering information on the basis of a rotation of the input shaft 12a relative to the output shaft 14a.

The steering sensor unit 16a comprises a closure lid 46a. The closure lid 46a is formed in one piece. The closure lid 46a provides a sensor receiving region 48a and functions as a sensor housing so that a separate, additional sensor housing can be omitted. The closure lid 46a also has a leadthrough opening 64a for the input shaft 12a, which opening is sealed, for example, by means of a radial shaft seal ring or an injected sealing element. In the mounted state, the closure lid 46a is arranged on the input shaft 12a and circumferentially encompasses the input shaft 12a. The closure lid 46a is provided to close, in the mounted state, the mounting opening 49a of the steering gear housing 50a for receiving the output shaft 14a, in a fluid-tight manner. Alternatively, however, a closure lid could also be formed in multiple parts. It is also conceivable to use an additional sensor housing.

In order to inductively detect the steering information, the steering sensor unit 16a furthermore comprises a sensor element 18a and a plurality of rotor elements 20a, 22a interacting with the sensor element 18a. The sensor element 18a and the rotor elements 20a, 22a are arranged at least partially in the sensor receiving region 48a of the closure lid 46a. In the present case, the steering sensor unit 16a comprises exactly two rotor elements 20a, 22a interacting with the sensor element 18a. The rotor elements 20a, 22a are provided to alter a sensor signal of the sensor element 18a, depending on a relative alignment of the rotor elements 20a, 22a to the sensor element 18a.

The sensor element 18a is formed in one piece. The sensor element 18a is arranged entirely in the sensor receiving region 48a. The sensor element 18a is fixedly, in particular non-detachably, connected to the closure lid 46a. In the present case, the sensor element 18a is fixedly connected to an inner side of the closure lid 46a that faces the sensor receiving region 48a. The sensor element 18a is furthermore arranged in the sensor receiving region 48a in such a manner that the sensor element 18a is arranged in the axial direction at the level of the input shaft 12a and encompasses the input shaft 12a in the circumferential direction. Furthermore, the sensor element 18a comprises at least one sensor coil 40a, 42a. In the present case, the sensor element 18a comprises, by way of example, two sensor coils 40a, 42a. The sensor coils 40a, 42a are designed as exciter and/or receiver coils, which are known per se. Furthermore, the sensor element 18a comprises a carrier element 44a that is formed as a printed circuit board for holding the sensor coils 40a, 42a and for connecting the sensor coils 40a, 42a to the closure lid 46a. The carrier element 44a extends perpendicularly with respect to the steering shaft 10a. Furthermore, the sensor coils 40a, 42a are arranged on various sides and/or receiving surfaces of the carrier element 44a. Furthermore, the sensor element 18a may comprise an exciter and/or evaluation circuit (not shown) which is arranged on the carrier element 44a, known per se and electrically connected to the sensor coils 40a, 42a. Alternatively, a sensor element could also comprise exactly one sensor coil or more than two sensor coils. It is also conceivable to form a sensor element separately from a closure lid and/or arrange it at the level of an output shaft.

Figure 3A:
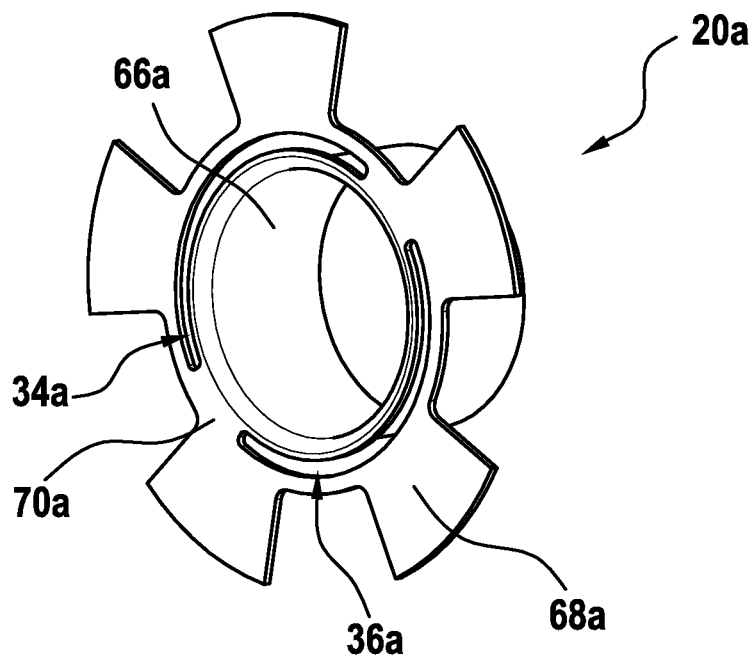

A first rotor element 20a of the rotor elements 20a, 22a is shown in detail in FIG. 3a. The first rotor element 20a is formed in one piece. The first rotor element 20a is arranged entirely in the sensor receiving region 48a. The first rotor element 20a is connected for conjoint rotation to the input shaft 12a. In the mounted state, the first rotor element 20a is non-detachably connected to the input shaft 12a. In the present case, the first rotor element 20a is connected to the input shaft 12a by means of a caulk connection. The first rotor element 20a is in the shape of a collar and circumferentially encompasses the input shaft 12a. Moreover, the first rotor element 20a consists at least partially of a conductive and/or magnetically permeable material. In the present case, the first rotor element 20a consists of metal, by way of example.

Furthermore, the first rotor element 20a is stepped and has exactly one step in the present case. The first rotor element 20a in this case comprises a first rotor portion 24a associated with the sensor element 18a, and a first fastening portion 66a associated with the input shaft 12a (cf., in particular, also FIGS. 2 and 3c). The first rotor portion 24a extends in the radial direction and/or perpendicularly with respect to the steering shaft 10a. Furthermore, the first rotor portion 24a is arranged in the axial direction at the level of the input shaft 12a. In the mounted state, the first rotor portion 24a is arranged on a side of the sensor element 18a that faces the output shaft 14a. The first rotor portion 24a furthermore comprises a plurality of radially external first rotor blades 68a for influencing the sensor element 18a and a radially internal connection ring 70a, which connects the first rotor blades 68a to the first fastening portion 66a and comprises a plurality of leadthrough openings 34a, 36a, in the present case, by way of example, two leadthrough openings 34a, 36a, arranged distributed in the circumferential direction. In the present case, each of the leadthrough openings 34a, 36a extends over at least 30%, advantageously over at least 40%, and less than 50% of a total circumference of the steering shaft 10a. The first fastening portion 66a extends in the axial direction and is provided for fastening to the input shaft 12a. The first fastening portion 66a is consequently arranged perpendicularly with respect to the first rotor portion 24a and, in the present case, extends from the first rotor portion 24a in the direction of the input shaft 12a and/or in the direction of the steering handle 54a. Alternatively, it is conceivable to form a first rotor element in multiple parts and/or from any other material that is conductive and/or magnetically permeable at least in a first rotor portion. In this context, it is in particular also conceivable to connect a first rotor element to an input shaft by means of a fused connection and/or an adhesive connection or the like. Furthermore, in principle, a first rotor element could also have at least two steps. Moreover, a first rotor portion could be arranged in the axial direction at the level of an output shaft, and/or a first fastening portion could extend from a first rotor portion in the direction of an output shaft. Furthermore, it is conceivable to dispense with a corresponding connection ring and arrange the first rotor blades directly on a first fastening portion. In this case, leadthrough openings could be arranged in the first rotor blades.

Figure 3B:
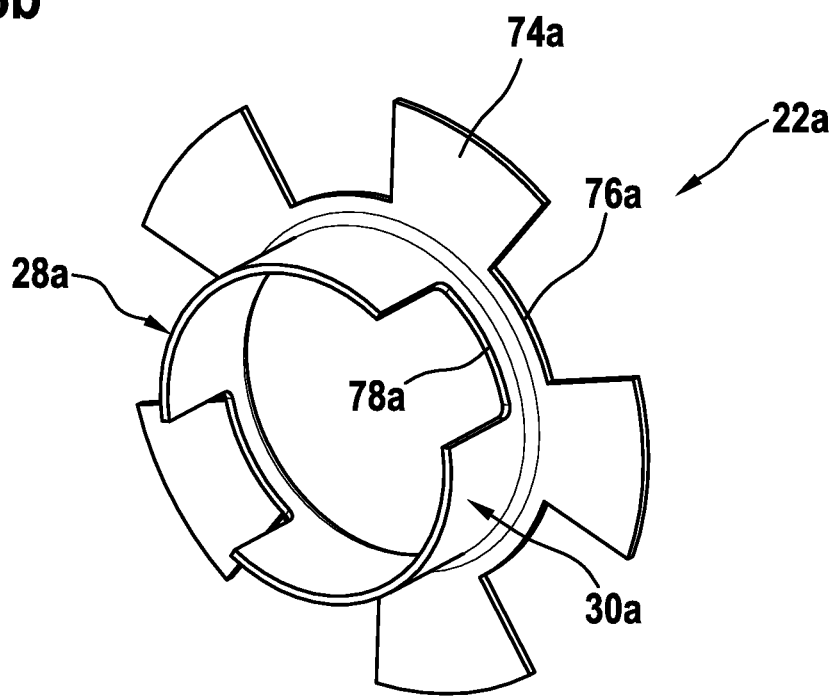

A second rotor element 22a of the rotor elements 20a, 22a is shown in detail in FIG. 3b. The second rotor element 22a is formed in one piece. The second rotor element 22a is arranged at least largely in the sensor receiving region 48a. The second rotor element 22a is connected for conjoint rotation to the output shaft 14a. In the mounted state, the second rotor element 22a is non-detachably connected to the output shaft 14a. In the present case, the second rotor element 22a is connected to the input shaft 14a by means of a caulk connection. The second rotor element 22a is in the shape of a collar and circumferentially encompasses the input shaft 12a and the output shaft 14a. Moreover, the second rotor element 22a at least partially made consists of a conductive and/or magnetically permeable material. In the present case, the second rotor element 22a consists of metal, by way of example.

Furthermore, the second rotor element 22a is stepped and has exactly one step in the present case. The second rotor element 22a in this case comprises a second rotor portion 26a associated with the sensor element 18a, and a second fastening portion 72a associated with the steering shaft 10a (cf., in particular, also FIGS. 2 and 3c). The second rotor portion 26a extends in the radial direction and/or perpendicularly with respect to the steering shaft 10a. The second rotor portion 26a is thus aligned parallel to the first rotor portion 24a. Furthermore, the second rotor portion 26a is arranged in the axial direction at the level of the input shaft 12a. In the mounted state, the second rotor portion 26a is in this case arranged on a side of the sensor element 18a that faces away from the output shaft 14a. Accordingly, in the present case, the first rotor portion 24a and the second rotor portion 26a are arranged in the axial direction on opposite sides of the sensor element 18a. The second rotor portion 26a furthermore comprises a plurality of radially external second rotor blades 74a for influencing the sensor element 18a and a radially internal first connection ring 76a, which connects the second rotor blades 74a to the second fastening portion 72a. The second fastening portion 72a extends in the axial direction and is provided for fastening to the output shaft 14a. For this purpose, the second fastening portion 72a comprises a plurality of fastening lugs 28a, 30a, in the present case, by way of an example, two fastening lugs 28a, 30a, arranged distributed in a circumferential direction and extending, in the mounted state, in an axial direction through the leadthrough openings 34a, 36a, in particular a respective one of the leadthrough openings 34a, 36a (cf. FIG. 3c). A length of the fastening lugs 28a, 30a in the axial direction is also less than a width of the fastening lugs 28a, 30a in the circumferential direction of the steering shaft 10a. In the present case, the width of the fastening lugs 28a, 30a is at least twice as long as the length of the fastening lugs 28a, 30a. In this case, each of the fastening lugs 28a, 30a extends over at least 30%, advantageously over at least 40%, and less than 50% of a total circumference of the steering shaft 10a. Furthermore, the second fastening portion 72a comprises a second connection ring 78a which connects the fastening lugs 28a, 30a to the second rotor portion 26a. The fastening lugs 28a, 30a are consequently arranged perpendicularly with respect to the second rotor portion 26a and, in the present case, extend from the second connection ring 78a in the direction of the output shaft 14a and/or in the direction of the steering control element 58a. The second fastening portion 72a and/or the fastening lugs 28a, 30a thus extend from the second rotor portion 26a in a direction opposite to the first fastening portion 66a. Furthermore, the fastening lugs 28a, 30a extend in the axial direction such that the fastening lugs 28a, 30a are guided out of the sensor receiving region 48a of the closure lid 46a and are at least partially free of overlap with the closure lid 48a when viewed in at least one direction perpendicular with respect to the steering shaft 10a (cf. FIG. 2). Alternatively, it is conceivable to dispense with guiding fastening lugs out of a sensor receiving region, for example when a frictional connection is used. Furthermore, it is conceivable to form a second rotor element in multiple parts and/or from any other material that is conductive and/or magnetically permeable at least in a second rotor portion. In this context, it is in particular also conceivable to connect a second rotor element to an output shaft by means of a fused connection and/or an adhesive connection or the like. Furthermore, in principle, a second rotor element could also have at least two steps. Moreover, a second rotor portion could be arranged in the axial direction at the level of an output shaft. Furthermore, a second rotor element could have a number of fastening lugs other than two, e.g., at least three or at least four fastening lugs. Furthermore, it is conceivable to dispense with a corresponding first connection ring and to arrange second rotor blades directly on a second fastening portion. Furthermore, it is conceivable to dispense with a corresponding second connection ring and to arrange fastening lugs directly on a second rotor portion.

Figure 4:
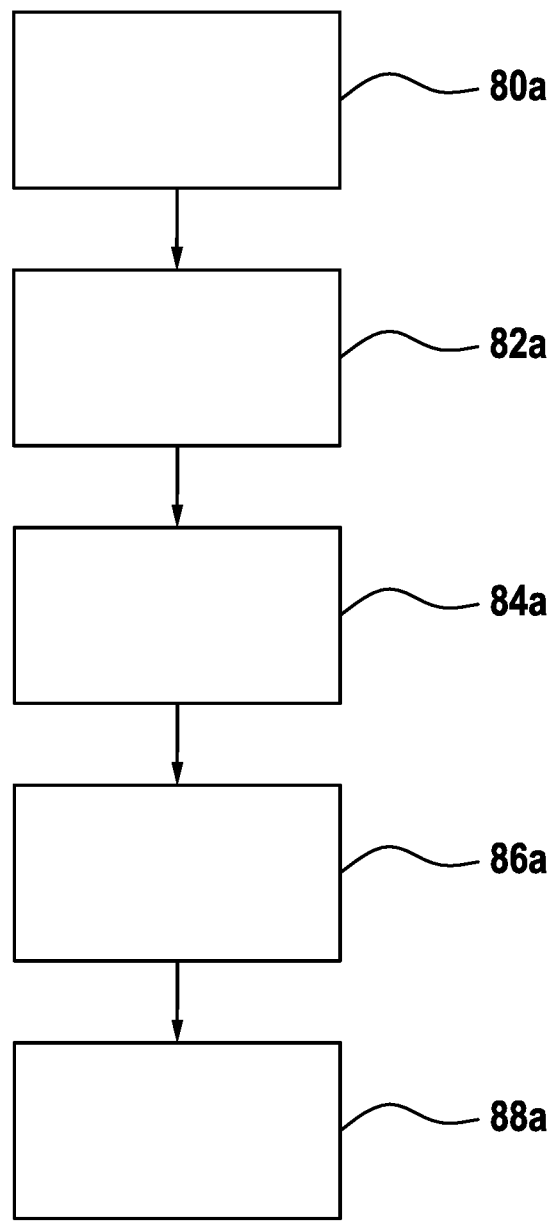

With reference to FIG. 4, an exemplary method for assembling the steering device is described below.

In a first assembling step 80a, a pre-assembled subassembly in the form of a closure lid assembly is produced at least from the closure lid 46a, the sensor element 18a and the second rotor element 22a.

In a second assembling step 82a, the first rotor element 20a is pushed onto the steering shaft 10a and fastened to the input shaft 12a via the first fastening portion 66a in order to connect the first rotor element 20a for conjoint rotation to the input shaft 12a. In the present case, the first rotor element 20a is connected to the input shaft 12a by means of a caulk connection, by way of an example.

In a third assembling step 84a, the fastening lugs 28a, 30a of the second rotor element 22a are inserted into the leadthrough openings 34a, 36a of the first rotor element 20a. For this purpose, the pre-assembled closure lid assembly comprising the closure lid 46a, the sensor element 18a and the second rotor element 22a is pushed onto the steering shaft 10a such that the fastening lugs 28a, 30a are automatically inserted into the leadthrough openings 34a, 36a when the closure lid assembly is pushed on. The closure lid assembly is in this case pushed onto the steering shaft 10a in a linear movement and in the axial direction from the direction of the input shaft 12a in the direction of the output shaft 14a. Alternatively, however, it is also conceivable to use a stationary closure lid assembly and insert a steering shaft into the closure lid assembly by means of a linear movement.

In a fourth assembling step 86a, the fastening lugs 28a, 30a are fastened to the output shaft 14a in order to connect the second rotor element 22a for conjoint rotation to the output shaft 14a. In the present case, the second rotor element 22a is connected to the output shaft 14a by means of a caulk connection, by way of example. In this assembling step, it is particularly advantageous for the fastening lugs 28a, 30a to be at least partially guided out of the sensor receiving region 48a of the closure lid 46a since this results in the second rotor element 22a or at least the fastening lugs 28a, 30a being freely accessible and being particularly simple to fasten to the output shaft 14a.

In a fifth assembling step 88a, the steering shaft 10a is inserted into the mounting opening 49a of the steering gear housing 50a and the mounting opening 49a is closed in a fluid-tight manner by the closure lid 46a, for example by means of a latch connection and/or an adhesive connection. Furthermore, a sensor cable can finally be connected to a plug connector (not shown) of the closure lid 46a.

The exemplary flowchart in FIG. 4 is only intended to describe a method for assembling the steering device by way of example. In particular, individual assembling steps and/or a sequence of assembling steps may vary. In this context, for example, it is conceivable to dispense with the first assembling step 80a and, accordingly, the manufacture of a closure lid assembly, and/or to vary the fifth assembling step 88a. It is also conceivable to provide additional assembling steps, e.g., an insertion of a gear and/or a shielding element. Moreover, a fastening of the fastening lugs 28a, 30a to the output shaft 14a may alternatively be performed directly and/or automatically upon insertion of the fastening lugs 28a, 30a of the second rotor element 22a into the leadthrough openings 34a, 36a of the first rotor element 20a, for example if a frictional connection is used to fasten the fastening lugs 28a, 30a to the output shaft 14a.

Figure 5A:
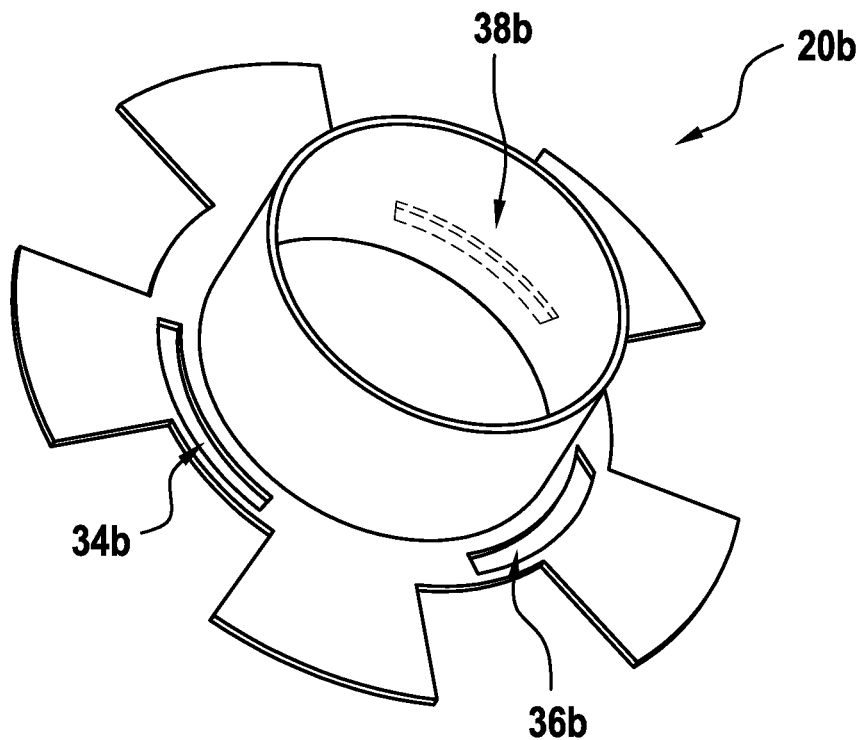
Figure 5B:
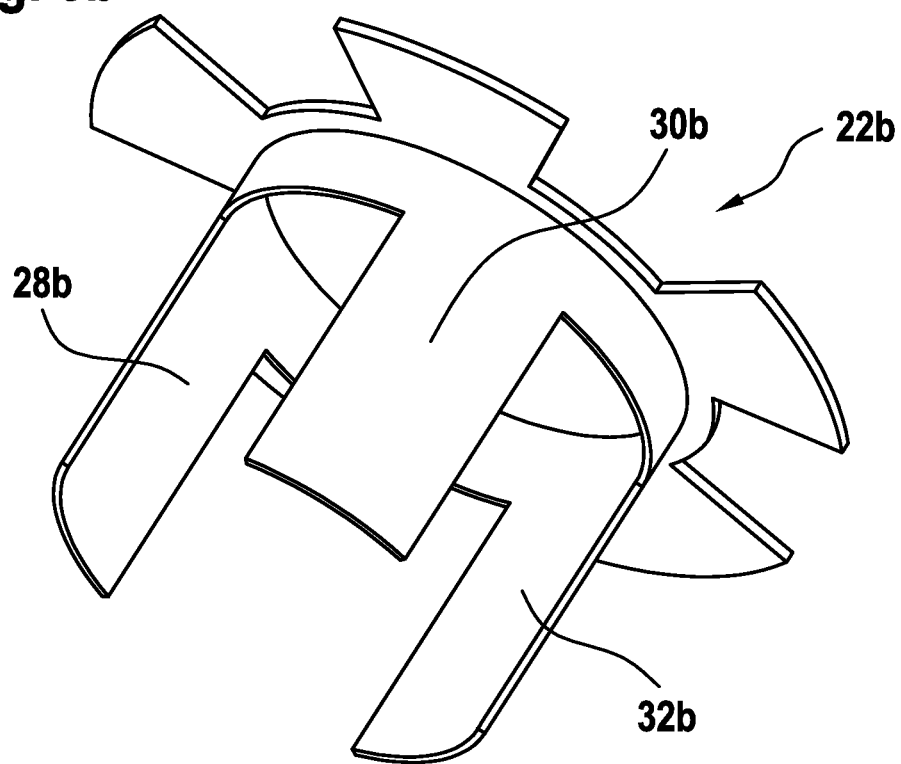
Figure 5C:
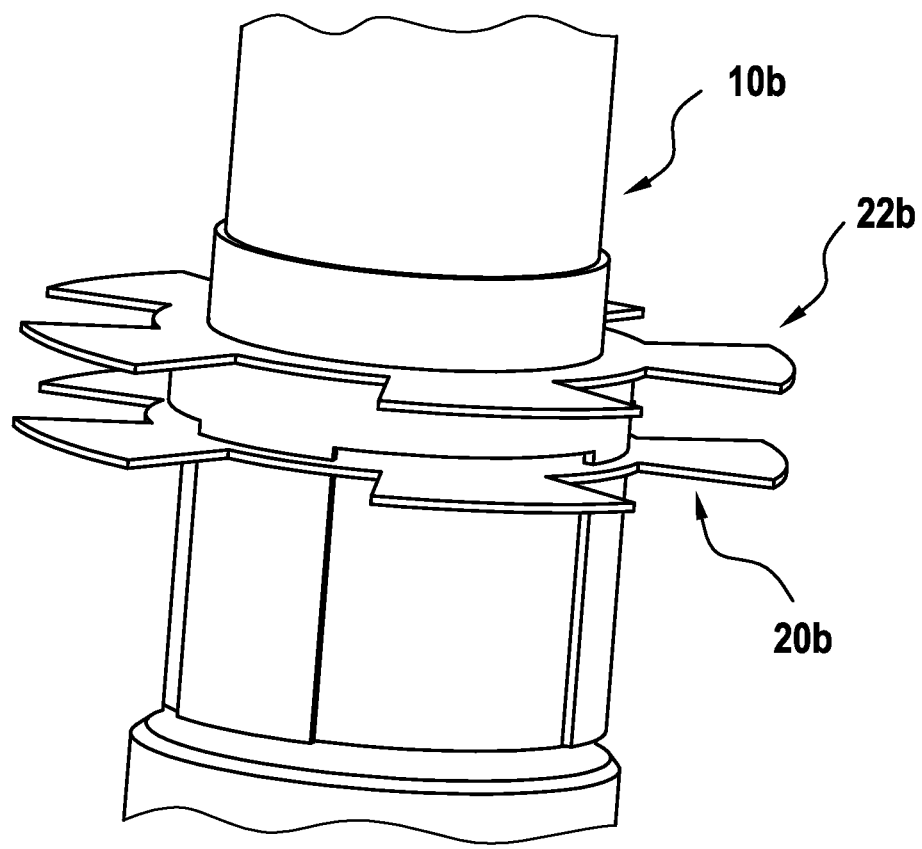

FIGS. 5a to 5c show a further exemplary embodiment of the disclosure. The following descriptions and the drawings are essentially limited to the differences between the exemplary embodiments, wherein reference can, in principle, also be made, with respect to identically designated components, in particular with respect to components having the same reference signs, to the drawings and/or description of the other exemplary embodiment, in particular FIGS. 1 to 4. In order to distinguish the exemplary embodiments, the letter a is appended to the reference signs of the exemplary embodiment in FIGS. 1 to 4. In the exemplary embodiments of FIGS. 5a to 5c, the letter a is replaced by the letter b.

The further exemplary embodiment of FIGS. 5a to 5c differs from the previous exemplary embodiment at least substantially by a number of leadthrough openings 34b, 36b, 38b of a first rotor element 20b as well as fastening lugs 28, 30b, 32b of a second rotor element 22b of a steering device.

In this case, the first rotor element 20b comprises three leadthrough openings 34b, 36b, 38b arranged distributed in the circumferential direction, wherein each of the leadthrough openings 34b, 36b, 38b extends over at least 15% and at most than 30% of a total circumference of a steering shaft 10b.

Furthermore, the second rotor element 22b comprises three fastening lugs 28b, 30b, 32b arranged distributed in the circumferential direction, said fastening lugs extending in the mounted state in the axial direction through the leadthrough openings 34b, 36b, 38b, in particular a respective one of the leadthrough openings 34b, 36b, 38b. In this case, a length of the fastening lugs 28b, 30b, 32b in the axial direction is greater than a width of the fastening lugs 28b, 30b, 32b in the circumferential direction of the steering shaft 10b. In the present case, the length of the fastening lugs 28b, 30b, 32b is at least twice as long as the width of the fastening lugs 28b, 30b, 32b. In this case, each of the fastening lugs 28b, 30b, 32b extends over at least 15% and at most 30% of a total circumference of the steering shaft 10b.

The invention claimed is:

1. A steering device with a rotatably mounted steering shaft, comprising:
   an input shaft;
   an output shaft formed separately from the input shaft; and
   a steering sensor unit configured to inductively detect at least one item of steering information, the steering sensor unit including at least one sensor element and at least two rotor elements configured to interact with the sensor element, wherein:
   a first rotor element of the at least two rotor elements is connected for conjoint rotation to the input shaft and has a first rotor portion which is associated with the at least one sensor element and extends perpendicularly with respect to the steering shaft,
   a second rotor element of the at least two rotor elements is connected for conjoint rotation to the output shaft and has a second rotor portion which is associated with the at least one sensor element and extends perpendicularly with respect to the steering shaft,
   the second rotor element has a plurality of fastening lugs fastened to the output shaft,
   the first rotor element defines a plurality of leadthrough openings that extend entirely through the first rotor element in an axial direction, and
   each of the plurality of fastening lugs extends in the axial direction through a respective one of the plurality of leadthrough openings.

2. The steering device according to claim 1, wherein the at least one sensor element comprises at least one sensor coil formed as an exciter and/or receiver coil, and at least one carrier element on which the sensor coil is arranged and which extends perpendicularly with respect to the steering shaft.

3. The steering device according to claim 1, wherein the first rotor portion and the second rotor portion are arranged in the axial direction at a level of the input shaft.

4. The steering device according to claim 1, wherein the first rotor portion and the second rotor portion are arranged in the axial direction on opposite sides of the at least one sensor element.

5. The steering device according to claim 4, wherein the first rotor portion is arranged on a side of the at least sensor element that faces the output shaft, and the second rotor portion is arranged on a side of the at least one sensor element that faces away from the output shaft.

6. The steering device according to claim 1, wherein the plurality of fastening lugs comprises at least three fastening lugs, and the plurality of leadthrough openings comprises at least three leadthrough openings.

7. The steering device according to claim 1, wherein the steering sensor unit comprises a closure lid which circumferentially encompasses the steering shaft, provides a sensor receiving region and is configured to close, in the mounted state, a mounting opening of a steering gear housing configured to receive the output shaft, and wherein the sensor element and the at least two rotor elements are arranged at least partially in the sensor receiving region of the closure lid.

8. The steering device according to claim 7, wherein the plurality of fastening lugs extend in the axial direction such that the plurality of fastening lugs are guided out of the sensor receiving region of the closure lid and, when viewed in at least one direction perpendicular with respect to the steering shaft, are at least partially free of overlap with the closure lid.

9. A steering system with a steering gear housing comprising at least one mounting opening and with at least one steering device according to claim 1.

10. A method for assembling a steering device according to claim 1, comprising:
   connecting the first rotor element to the input shaft for conjoint rotation;
   inserting each of the plurality of fastening lugs of the second rotor element into the respective one of the plurality of leadthrough openings of the first rotor element; and
   fastening the plurality of fastening lugs to the output shaft to connect the second rotor element for conjoint rotation to the output shaft.

11. The method of claim 10, wherein, using at least the sensor element, the second rotor element and a closure lid for closing a mounting opening of a steering gear housing, a pre-assembled closure lid assembly is produced, and the pre-assembled closure lid assembly is pushed onto the steering shaft such that each of the plurality of fastening lugs is inserted into the respective one of the plurality of lead-through openings.

\* \* \* \* \*